(12) United States Patent
Boscolo Berto et al.

(10) Patent No.: US 10,749,455 B2
(45) Date of Patent: Aug. 18, 2020

(54) METHOD FOR CURRENT CONTROL AND CORRESPONDING SYSTEM AND APPARATUS

(71) Applicant: STMICROELECTRONICS S.R.L., Agrate Brianza (IT)

(72) Inventors: Michele Boscolo Berto, Sesto San Giovanni (IT); Ezio Galbiati, Agnadello (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 940 days.

(21) Appl. No.: 14/920,042

(22) Filed: Oct. 22, 2015

(65) Prior Publication Data

US 2016/0218647 A1 Jul. 28, 2016

(30) Foreign Application Priority Data

Jan. 27, 2015 (IT) .............................. TO2015A0058

(51) Int. Cl.
| | |
|---|---|
| *H02P 6/12* | (2006.01) |
| *H02P 6/28* | (2016.01) |
| *H02M 3/158* | (2006.01) |
| *H02P 29/032* | (2016.01) |
| *G11B 19/20* | (2006.01) |
| *H02M 1/00* | (2006.01) |
| *G11B 19/28* | (2006.01) |

(52) U.S. Cl.
CPC ............ *H02P 6/28* (2016.02); *G11B 19/2054* (2013.01); *H02M 3/158* (2013.01); *H02P 29/032* (2016.02); *G11B 19/28* (2013.01); *H02M 2001/0009* (2013.01)

(58) Field of Classification Search
CPC .. H02P 6/28; H02M 3/158; H02M 2001/0009
USPC .................................................... 318/400.15
See application file for complete search history.

(56) References Cited

U.S. PATENT DOCUMENTS

| 6,301,137 B1 * | 10/2001 | Li ..................... H02M 7/53873 |
| | | 318/801 |
| 6,873,126 B2 * | 3/2005 | Inao .......................... H02P 6/14 |
| | | 318/400.28 |
| 7,906,949 B1 * | 3/2011 | Sutardja ................ H02M 3/157 |
| | | 323/282 |
| 8,803,445 B2 * | 8/2014 | Pflaum ............... H05B 33/0815 |
| | | 315/217 |
| 9,282,605 B2 * | 3/2016 | Lai ..................... H05B 33/0887 |

(Continued)

*Primary Examiner* — Eduardo Colon Santana
*Assistant Examiner* — Gabriel Agared
(74) *Attorney, Agent, or Firm* — Slater Matsil, LLP (57) ABSTRACT

An ohmic-inductive electrical load, such as an electric motor, for example, for a hard-disk drive, is driven by supplying thereto a load current via a switching power stage supplied with a source current delivered by a supply source. The driving action may include sensing the load current; estimating the source current starting from the load current sensed; generating a feedback signal that assumes different values as a function of the result of the comparison between the source current estimated and a source-current threshold value; and driving the switching power stage via the feedback signal, increasing or decreasing, respectively, as a function of the different values assumed by the feedback signal, the load current, thereby controlling the source current.

30 Claims, 5 Drawing Sheets

(56) References Cited

U.S. PATENT DOCUMENTS

| | | | |
|---|---|---|---|
| 2004/0008016 A1* | 1/2004 | Sutardja | H02M 1/088 323/283 |
| 2004/0095119 A1* | 5/2004 | Kernahan | H02M 3/157 323/282 |
| 2004/0095264 A1* | 5/2004 | Thomas | H02M 3/157 341/53 |
| 2010/0295489 A1 | 11/2010 | Sano | |
| 2011/0221369 A1* | 9/2011 | Welchko | H02P 29/0241 318/400.22 |
| 2012/0112681 A1* | 5/2012 | Bonvin | G11B 19/28 318/503 |
| 2014/0103894 A1* | 4/2014 | McJimsey | G05F 1/67 323/282 |

* cited by examiner

METHOD FOR CURRENT CONTROL AND CORRESPONDING SYSTEM AND APPARATUS

TECHNICAL FIELD

The present disclosure relates to techniques for controlling the current that can be delivered, for example, to ohmic-inductive loads, via switching power stages. One or more embodiments may find application in driving electric motors.

BACKGROUND

In the applications that involve use of small brushless d.c. (BLOC) motors, for example, small-sized motors like the ones that can be used for hard-disk drives (HDDs), the amount of energy (current) that can be delivered by the supply source (battery or power supply) may be lower than the maximum one that can potentially be absorbed by the motor.

In such cases, it is hence possible to think of limiting the maximum current that is to supply the motor to levels that are tolerable for the supply source itself. At the same time, it is possible to act so as to cause the maximum current circulating in the coils of the motor not to exceed certain limit values.

In a switching driving circuit, current limitation may be obtained by limiting the operating duty-cycle of the power stage, for example, via dedicated circuits that use a feedback signal such as, for example, the current circulating in the load.

In this way, it is possible to control the maximum current circulating in the load (and hence circulating in the power stage), but not the current absorbed by the supply source.

In various situations, for example, when filter capacitances are present on the power supply line of the power-using device (the so-called "application"), it is possible to detect a difference between the current delivered by the power-supply circuit and the current circulating in the load. This difference between the two currents is a function of the operating duty-cycle of the power stage.

For instance, if the operating duty-cycle of the power stage is lower than 100%, the current that can be delivered by the supply source may be lower than the current absorbed by the load (which is of an inductive nature).

The mean value of the current delivered by the source may hence differ from the mean value of the current absorbed by the load, albeit preserving the energy balance in so far as the powers involved are the same: if the power supplied by the source is VCC*Iline (where VCC is the voltage of the supply source) and the power absorbed by the load is Vload*Iload where Vload=VCC*DC (where DC is the duty-cycle), the energy balance can be maintained in so far as VCC*DC*Iload=VCC*Iline.

For DC<100% the (mean) line current may, however, be lower (by a factor given by DC) than the (mean) load current. This difference may be quite considerable, which renders desirable the possibility of optimization of the global operation of the system by controlling both the current of the load and the current of the supply source.

In the case where the load is provided by a BLDC motor, control alone of the current of the motor, which may be used in various implementations, does not enable optimal exploitation of the energy that can be delivered by the supply source. The latter may thus be under-exploited, for example, during startup of the motor when the currents involved are high and the operating duty-cycle of the power stage may be lower than 100%.

For a simultaneous control of both of the currents (current of the motor and current of the supply source), it would be possible to hypothesise recourse to two distinct sensing elements, with a consequent increase in the cost of the application.

In applications where the aim is to reduce as much as possible the cost of the application—such as, for example, for hard-disk drives (HDDs)—it is possible to carry out current control not on the power supply line upstream of the filter capacitance/capacitances, but on the motor current. In some cases, it is possible to carry out control of the current on the power supply line, but downstream of the filter capacitance/capacitances. In this second case, it is, however, difficult to guarantee a good control of the current delivered by the supply source (line current).

To sense the current circulating in the motor (i.e., in the load) it is possible to envisage use of an external resistance (Rsense), i.e., of a sensing element integrated in the driving circuit (for example, sense-FETs), which enables minimization of the costs of the application.

Direct sensing of the effective current delivered by the supply source may use an element set in series to the power supply line and upstream of the filter capacitance. In some applications, such as, for example, HDDs, the cost of a sensing element upstream of the filter capacitances may not be negligible so that it appears preferable to carry out a control of current circulating in the motor (for example, via sense-FETs integrated in the power stage or else via a sensing resistance) or else to carry out a control of the line current downstream of the filter capacitances (for example, via sense-FETs integrated in the ISOFET, an element used for decoupling the motor from the power supply line). In HDD applications direct control of the effective current delivered by the supply source is not usually envisaged.

SUMMARY

One or more embodiments enable optimization of the functions of the current limiter in circuits in which the load is of an ohmic-inductive type and the power stage is of a switching type.

One or more embodiments are suited to being used, for example, for controlling current in BLDC motors in hard-disk drive (HDD) applications.

One or more embodiments enable maximization of the current absorbed by the supply, simultaneously maintaining control of the maximum current circulating in the motor, using just one current-sensing element.

One or more embodiments enable implementation of a dual control on the line current and on the current of the motor.

In applications such as, for example, HDD applications, one or more embodiments enable minimization of the startup time (i.e., minimization of Time-To-Ready).

One or more embodiments enable provision of a system for controlling the line current for ohmic-inductive loads driven by a switching power stage.

One or more embodiments may envisage that the line current is not directly measured, but estimated on the basis of the current circulating in the load and the operating duty-cycle of the power stage.

In one or more embodiments, the estimate of the line current can be carried out by multiplying the value of the load current by the value of the duty-cycle of the power stage.

In one or more embodiments, estimation of the line current can be carried out by filtering the signal coming from the sensing element via a lowpass filter. In one or more embodiments, the above lowpass filter may have the same cutoff frequency as the lowpass filter made up of the line resistance and inductance and by the filter capacitances connected to the power-using device (application).

One or more embodiments may envisage generation of a feedback current signal of an impulsive type through annulment of the feedback signal during the OFF phases of the switching power stage.

BRIEF DESCRIPTION OF THE DRAWINGS

One or more embodiments will now be described, purely by way of non-limiting example, with reference to the annexed figures, wherein.

DETAILED DESCRIPTION

Illustrated in the ensuing description are various specific details aimed at providing an in-depth understanding of various examples of embodiments. The embodiments may be obtained without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Furthermore, particular conformations, structures, or characteristics may be combined in any adequate way in one or more embodiments.

The references used herein are provided only for convenience and hence do not define the extent of protection or the scope of the embodiments.

Figure 1:
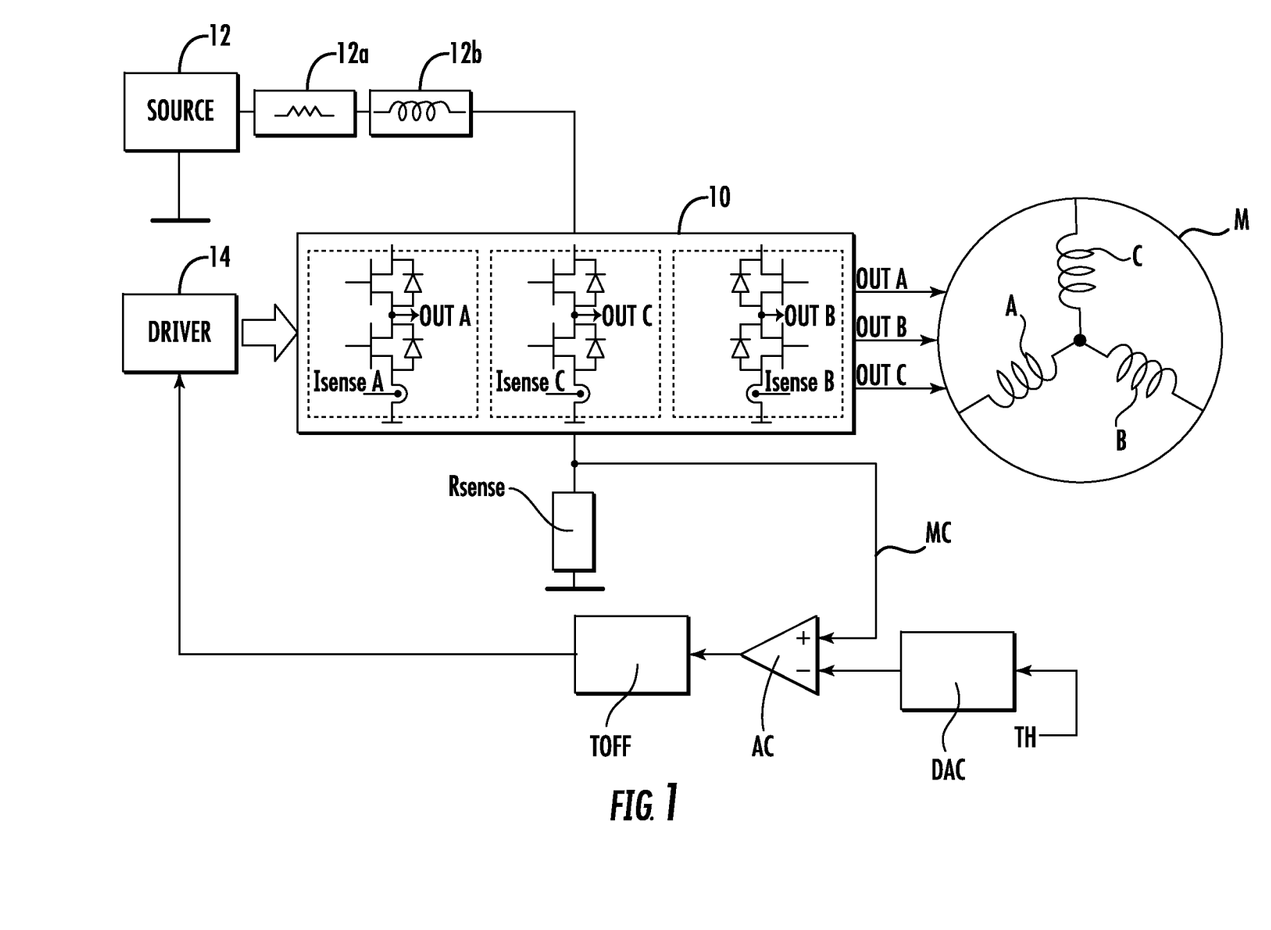
FIG. 1 is a block diagram of a current-control system for a ELDC motor.

The block diagram of FIG. 1 exemplifies the possible structure of a current-control system for an inductive (or ohmic-inductive) load, for example, for an electric motor M such as a BLDC motor that can be used for hard-disk drives (HDDs).

In HDD applications, as in various similar applications, for example, applications that use small BLDC motors, it may be desirable to be able to limit the maximum current absorption (peak current) by the motor in order not to exceed the maximum current that can be delivered by the supply source. The maximum current that can be absorbed by the motor (and the one that can be handled by the power stage) may in fact be higher than the current that can be delivered by the supply source. Such an action of current limitation may hence be aimed at preserving the integrity of the supply source, rather than that of the power stage and of the motor.

Applications like the one presented in FIG. 1 envisage that current control is obtained through sensing of the load current, which might not enable optimization of the system.

In the diagram of FIG. 1, the motor M (for example, the three phases A, B, and C thereof) is driven by a power stage 10 of the switching type, where the driving signals (voltages) OUTA, OUTB, OUTC of the three phases A, B, and C are signals of an on/off type generated, for example, by electronic switches, such as MOSFETs. These switches may be organized in pairs (half-bridges) of elements operating, respectively, on the high side (H) and on the low side (L) with respect to the point of acquisition of the signal OUTA, OUTB, OUTC and may be driven, alternatively, into an ON condition or condition of conduction or else an OFF condition or condition of non-conduction.

By appropriately turning on the electronic switches, it is possible to apply to the load a voltage equal to the supply voltage or else a zero voltage. The time of application to the load of the supply voltage is designated by "TON", whereas the time of application to the load of the zero voltage is designated by "TOFF". The ratio TON/(TON+TOFF) is defined as operating duty-cycle.

With reference to FIG. 1, an ON phase can be obtained by turning on a high-side switch of a half-bridge and by turning on a low-side switch of another half-bridge of the power stage 10 (keeping, for example, the third half-bridge in a condition of non-conduction or high impedance). The OFF phase can, instead, be obtained by turning on either the high-side switches or the low-side switches of the two active half-bridges, maintaining, for example, the third half-bridge in a condition of non-conduction (high impedance).

It may be found that the mean value of the current circulating in the load and the mean line current are different, with a difference that increases in the case of decreasing duty-cycle values.

The power stage 10 operates on a supply of the motor M supplied starting from a source 12 (for example, a mains supply or a battery) via a power supply line that may present respective values of ohmic resistance and inductance represented by way of example by the blocks 12*a* and 12*b*.

Driving of the switch of the stage 10 is entrusted to a driving module or driver 14 that controls the ON and OFF times (TON or TOFF) of the switches of the stage 10, for example, by controlling the duty-cycle of the voltages across the coils of the motor M according to a scheme that is substantially equivalent to a pulse width modulation (PWM).

Figure 5:
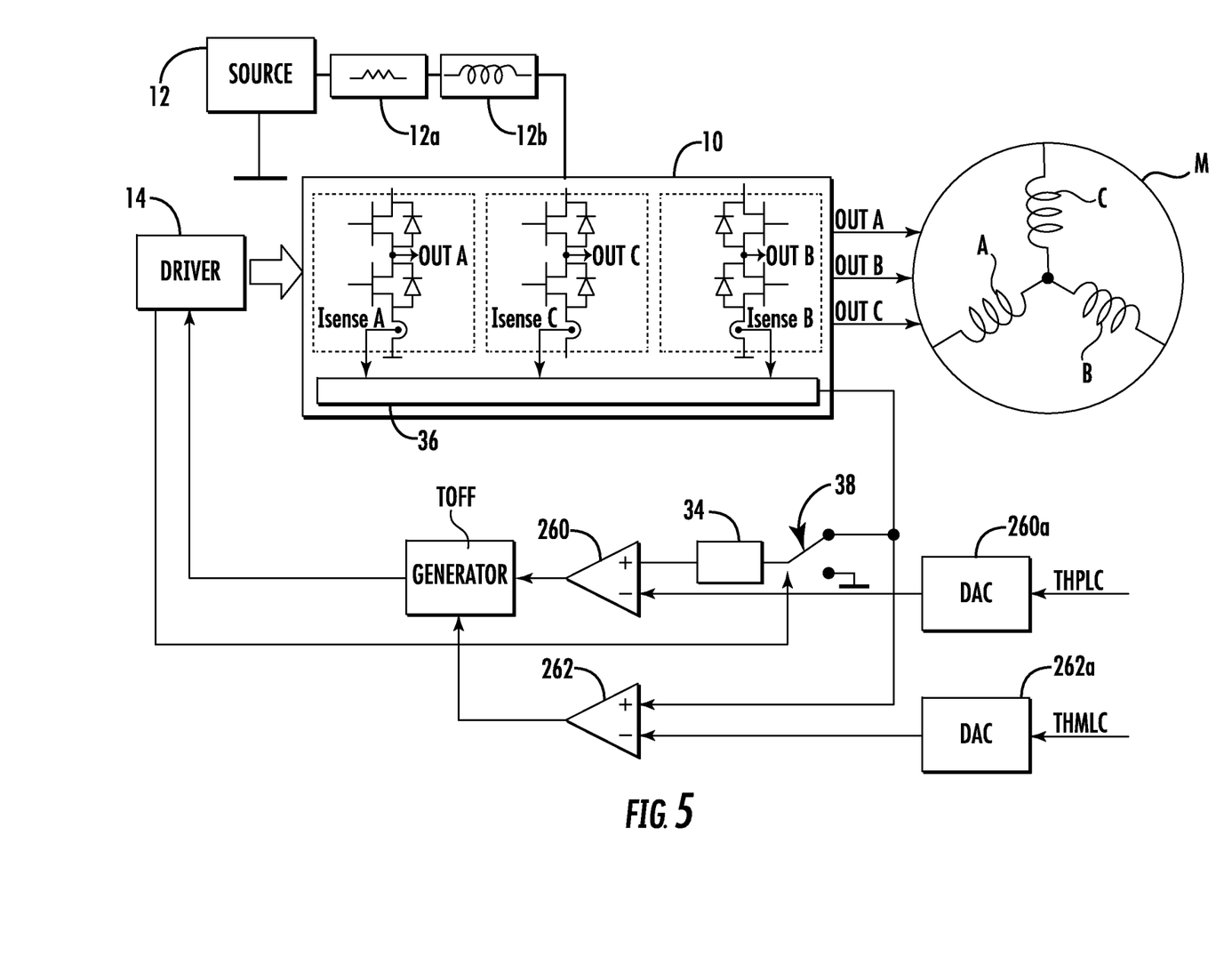
FIG. 5 is a block diagram of an apparatus incorporating a system according to embodiments of this disclosure.

Added to the above is the possibility (to which we shall return in the final part of this description with reference to the diagram of FIG. 5) of detecting respective sensing signals IsenseA, IsenseB and IsenseC indicating the value of the currents generated for each phase of the motor M.

The foregoing corresponds to criteria known and used in the art, which renders any more detailed description herein superfluous.

The diagram of FIG. 1 exemplifies an approach of current control applied to a motor M (for example, a BLDC motor), where a sensing element is present comprising, for example, a sensing resistance Rsense that is able to detect (e.g., through the voltage drop across it) the value of the current of the motor M. This value can be sent on a line MC to a comparator (e.g., an analog comparator) AC to be compared with a reference threshold value TH, for example, available in digital form and converted into analog form by a digital-to-analog converter DAC. The output signal of the comparator AC can be applied to a controller module TOFF for generating, as a function of the deviation detected by the comparator AC, the value of the duty-cycle (e.g., the value of the interval TOFF, i.e., of the interval of application of the zero voltage) used by the module 14 for driving the switches of the power stage 10.

In a scheme such as the one exemplified in FIG. 1, it is on the other hand possible to use other sensing methods (for example, a so-called sense-FET to which we shall return in what follows): the circuit exemplified in FIG. 1 is thus to be considered purely indicative.

Whatever the sensing method used, in a scheme such as the one exemplified in FIG. 1 the peak of the current of the motor e.g. the voltage across Rsense), is to be compared in the analog comparator AC with a threshold TH that (in the converter DAC) is subjected to a digital-to-analog conversion. When the current threshold is reached, it is possible to force a decay of the current circulating in the motor for a time TOFF set by the block.

Consequently, in a current-control circuit of this type, a peak control of the current of the motor is carried out that may result in an unsatisfactory control of the current delivered by the supply source. As already mentioned previously, in systems controlled by a switching stage (i.e., a PWM stage), such as the stage 10, the mean value and the peak value of the current absorbed by the supply source 12 may be lower than the mean value and peak value of the current of the motor, with a difference that may be the higher, the lower the operating duty-cycle of the switching power stage 10. The peak control on the current of the motor hence does not enable maximum exploitation of the current that can potentially be delivered by the supply source, which may consequently be under-exploited.

In the case, for example, of HDD applications, this may result in a lack of optimization of the time of acceleration of the motor (Time-To-Ready not minimized).

In applications in which filter capacitances, connected on the power supply line, are present and driving of the load is of the switching type, it is also possible to find, in particular in the presence of high operating frequencies, a marked difference between the peak value of the current absorbed by the source 12 and the value detected via the sensing element (for example, Rsense in FIG. 1).

In one or more embodiments, it is possible to control, for example, via just one sensing element, not only the peak current of the load (for example, the motor M), but also the mean current and/or the peak current delivered by the supply source 12, this source in itself not forming part of the embodiments, which are to be supplied with the current delivered by such a source.

It is thus possible to better exploit the current that can be delivered by the supply source 12, optimizing the performance of the application, which, for example, in the case of HDDs, may result in a shorter startup time of the motor.

In this connection, it has been noted that, in a switching control system, for example, of the PWM type exemplified herein, the mean value of the current (mean current) delivered by the supply source 12, the value of the load current, and the operating duty-cycle of the stage 10 can be linked by a relation of the following type:

$$I\_LineMean = I\_LoadMean * Duty\text{-}cycle$$

where:
I_LineMean is the mean value of the current (i.e., the mean current) delivered by the supply source 12 (power-supply current);
I_LoadMean is the mean value of the current (i.e., the mean current) circulating in the load, i.e., in the present case, the current circulating in the coils of the motor M (motor-coil current); and
Duty-cycle is the ratio TON/(TON+TOFF) between the time in which the power stage PWM applies a voltage to the load equal to the supply voltage (ON time, TON) and the PWM period (i.e., the sum of ON time and OFF time: TON+TOFF).

It may thus be noted that the mean and peak currents delivered by the supply source may in itself be lower than the mean and peak currents circulating in the coils of the motor, so that a current-control circuit based upon the peak current of the motor may not be able to guarantee an optimal exploitation of the energy that can be supplied by the supply source.

One or more embodiments can base their operation on the criterion of using the estimate of the mean value and/or peak value of the current delivered by the supply source as feedback data for the current-control circuit, simultaneously maintaining a control of the peak (maximum) current in the load.

Described in what follows, with reference to FIGS. 2 to 5, are various examples of embodiments in which it is envisaged to control the mean value or else the peak value of the current delivered by the supply source, with the choice of the specific form of implementation that it may be dictated by the options of embodiment and/or by possible constraints linked to the supply source 12.

In FIGS. 2 to 5, parts, elements, or components that are equivalent or similar to parts, elements, or components already described in relation to FIG. 1 are simply designated by the same symbols/reference numbers that already appear in FIG. 1, and the corresponding description will not be repeated herein.

Figure 2:
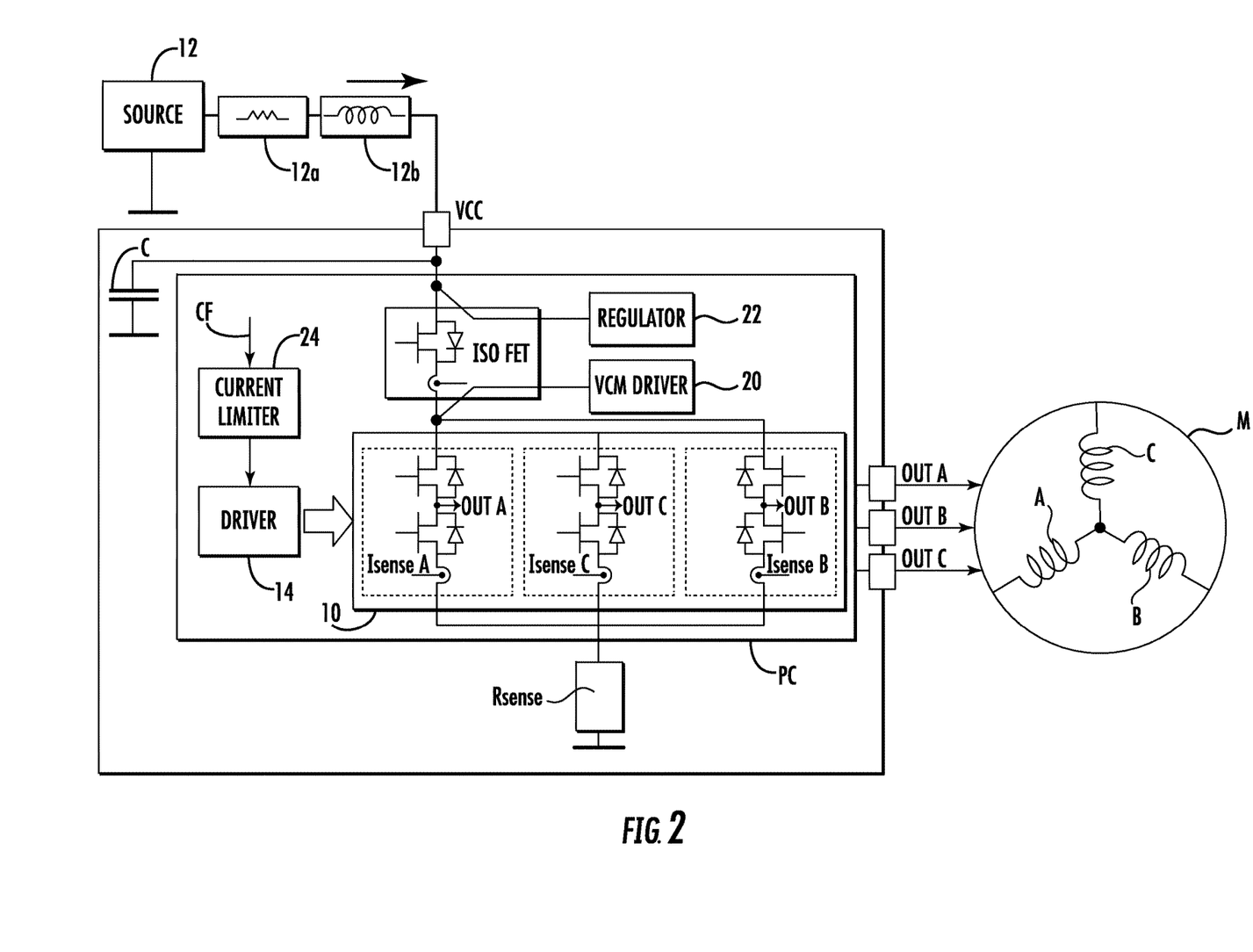
FIG. 2 is a block diagram illustrating the possible sphere of use of embodiments of this disclosure.

The diagram of FIG. 2 exemplifies a general scheme into which one or more embodiments may fall, where an estimate of the current (for example, mean current) delivered by the supply source 12 is made.

The above estimate can be made noting that the value of the duty-cycle is a known parameter (which may, for example, be detected at the output from the driving module 14) while the current (for example, the peak current) circulating in the load, i.e., in the motor M is also known, for example, in so far as it can be detected via the sensing resistance Rsense or else via sense-FETs integrated in the power stage 10. In this way, it is possible to calculate an estimate (for example, of the mean value) of the current delivered by the supply source 12 even without a direct measurement thereof.

Even though the current in the load is not known precisely, it may be assumed that its value does not exceed the value set by a circuit designed as a current limiter. It may hence be assumed that the estimate of the value (e.g., the mean value) of the current delivered by the supply source is exact or at the most underestimated, but not overestimated, it being thus possible to prevent the supply source itself from being overloaded.

The diagram of FIG. 2 exemplifies a possible scenario of application of the criterion outlined above in the case of a hard-disk drive (HDD). In such a diagram, the power stage 10 and the driving module 14 are included in a power combo PC, which comprises other auxiliary circuits, such as a VCM driver, and one or more regulators 22 provided for operation of the HDD.

In the diagram provided by way of general example in FIG. 2, represented explicitly is the presence of a current-limiter module 24, which acts on the stage 10 so as to increase/decrease the current in the motor M (i.e., in the load), for example by varying the operating duty-cycle of the stage 10 as a function of a feedback current signal (current feedback) CF in the terms clarified in what follows.

FIG. 2 also shows the possible presence (which for simplicity of representation does not appear in all the other figures) of:

an ISOFET circuit acting between the point of connection of the source 12 to the power combo PC and the input of the switching power stage 10 (i.e., in a position set between the VCM driver 20 and the regulator or regulators 22) to decouple the motor M and the stage 10 from the power line; and/or one or more filter capacitances C that can be viewed as located in the point in which the power combo PC is connected to the electric power line that comes under the supply source 12 and has a resistance 12a and an inductance 12b.

The connection between the supply source 12 and the aforesaid power combo PC may thus give rise to a behavior resembling that of an RLC lowpass filter comprising the resistance 12a (R), the inductance 12b (L) of the connection line and the filter capacitance or capacitances (C).

When the switching power stage 10 functions with a duty-cycle of less than 100%, the current delivered by the supply source is of an impulsive type. This impulsive current is filtered by the aforesaid RLC lowpass filter: the greater the filtering effect of the lowpass filter, the smaller the ripple of line current around the mean value. It is thus possible to increase the current absorbed by the motor to optimize exploitation of the energy that can be delivered by the supply source.

Figure 3:
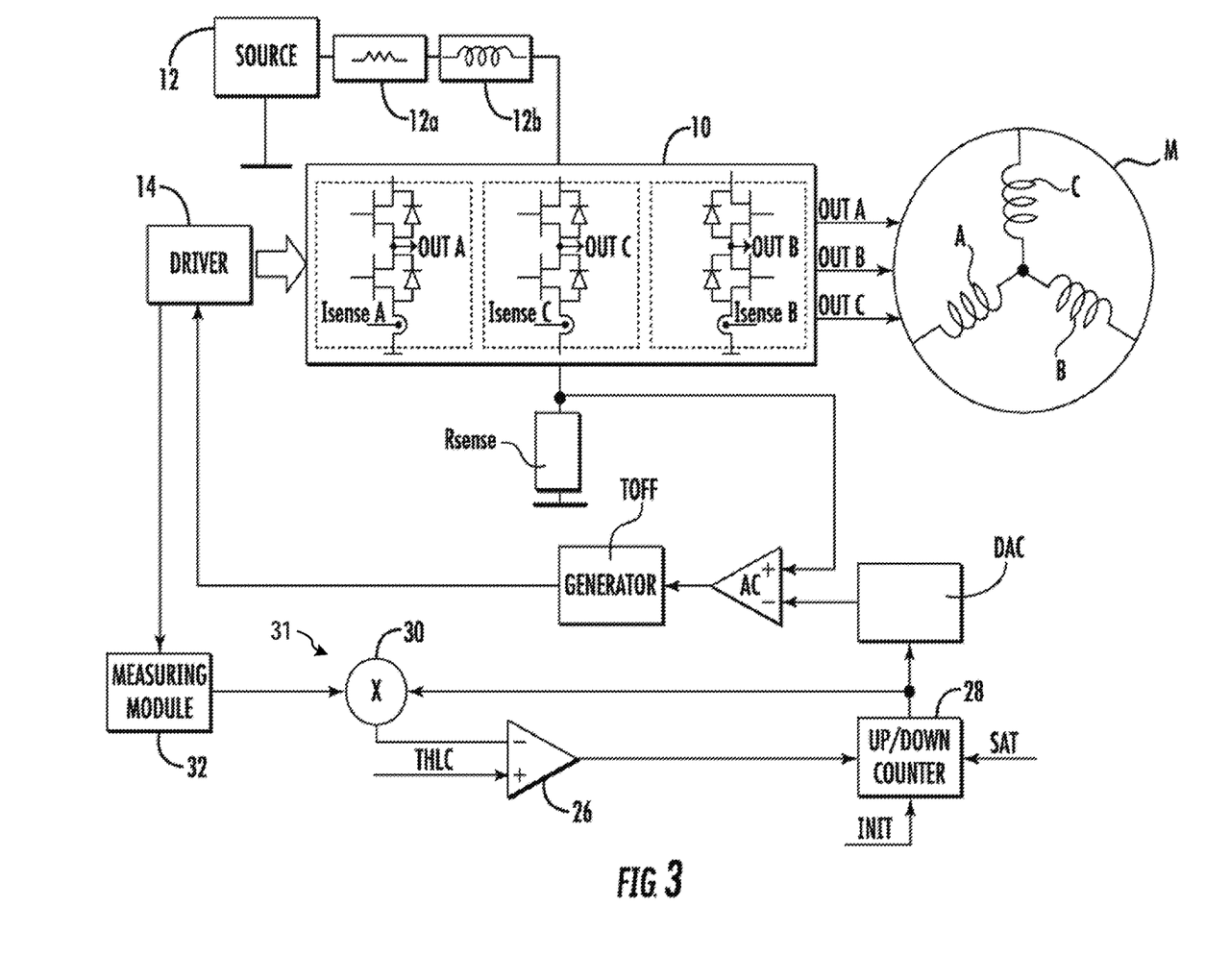
FIG. 3 is a block diagram of an apparatus incorporating a system according to embodiments of this disclosure.

FIG. 3 illustrates an example (which is purely indicative and non-binding) of one or more embodiments that can be implemented in the scenario represented in FIG. 2.

Shown in the example of FIG. 3 are two circuits designed for limiting the current: one, which is controlled (basically as described previously in relation to FIG. 1) by an analog comparator AC like the one that, in the diagram of FIG. 1, is dedicated to control of the peak current of the motor; and the other, which is controlled by a digital comparator 26 dedicated to the control of the current (for example, the mean current) delivered by the supply source 12.

In one or more embodiments as exemplified in FIG. 3, the digital-to-analog converter DAC can be controlled by an UP/DOWN counter, designated by 28, which enables increase (for example, with an UP count) or decrease (for example, with a DOWN count) the current-limiting threshold of the motor M (see also the threshold TH of FIG. 1).

In one or more embodiments, the counter 28 can operate as a function of the output signal of the digital comparator 26, which is configured for comparing with a threshold value of the line current THLC the output signal of a multiplier (for example, a digital multiplier) 30, which receives at input the output value of the counter 28 (peak current circulating in the load) and the value of the duty-cycle of the stage 10, sensed starting from the driving module 14, for example, in a measuring module 32.

The signal at output from the multiplier 30 can hence be viewed as IloadPeak*DutyCycle, so that—with reference to the relation recalled previously—the output signal of the multiplier 30 may be viewed, at least to a first approximation, as corresponding to the product I_LoadMean*Duty-cycle that identifies the estimated value I_LineMean of the (mean) current delivered by the source 12, and multiplier 30 can hence be viewed as part of estimator circuit 31.

The fact of using for the purposes of estimation—mainly for reasons of simplicity—the peak current in the load (output of the counter 28) instead of the mean value of the current in the load could be such as to induce an error in the estimation of IlineMean: in practice it is, however, only a slight overestimate of the mean value of the current delivered by the supply source, and hence such as not to jeopardize proper operation of the embodiments.

In one or more embodiments, the counter 28 can thus be enabled as UP counter (and hence, for example, such as to increase the current in the motor) if the product between the current and the duty-cycle is lower than the threshold THLC.

In a dual way, in one or more embodiments, the counter 28 can thus be enabled as DOWN counter (and hence, for example, such as to reduce the current in the motor) if the product between the current and the duty-cycle is higher than the threshold THLC.

In this way, the feedback signal generated by the comparator can drive the generator TOFF so as to increase or decrease the duty-cycle of the stage 10 to increase or decrease, respectively, the current delivered by the latter to the load (motor M), with the effect of keeping the mean value of the line current delivered by the source 12 within the threshold value THLC (in practice, at this threshold value). It is thus possible to carry out an action of control of the (mean) current absorbed by the source 12, improving the exploitation thereof.

In one or more embodiments, the counter 28 may be initialized at a value that can be set via a signal INIT and may be saturated at a maximum value that can be set via a signal SAT.

The signal INIT enables initialization of the counter 28 at a pre-set value and hence initialization of an initial current (for example, peak current) of the motor M that is to be modified on the basis of the mean current delivered by the power-supply circuit 12.

The signal SAT enables limitation of the maximum current in the motor M irrespective of whether the desired value of mean line current is reached or not, and hence makes it possible to take into account the maximum current capacity of the power stage and the maximum current that can be tolerated by the motor.

In this way, the current in the motor M is in effect controlled not only as a function of the value of the line current estimated starting from the current in the load (motor M), but also as a function of the value of the current in the load effectively detected.

In one or more embodiments, in the case where the mean value of the current that the supply source 12 is able to supply is known, the threshold signal THLC can be chosen with a value equal to the aforesaid value of mean current deliverable (admissible current) for the supply source itself.

In one or more embodiments, in the case where the maximum (peak) value of the current that the supply source 12 is able to deliver is known, the signal THLC may be chosen with a value equal to or, optionally, lower than the value of maximum current admissible for the supply source 12 itself so as to take into account any possible current ripple, thus preventing the maximum value admissible from being exceeded. For instance, it is possible to set, on the value of the signal THLC, an offset with respect to the value of maximum current that can be delivered by the supply source. This offset may be constant or else be a function of the operating duty-cycle of the power stage 10: the current ripple can in fact depend upon the duty-cycle of the power stage, it being maximum when the duty-cycle 50%. In order to optimize the system, it is hence possible to use an offset that varies as a function of the duty-cycle.

In one or more embodiments, that fall within the scheme exemplified in FIG. 3, the current delivered by the supply source 12 (power-supply current) can be kept constant at a value slightly lower than a maximum value allowed by the supply source (for example, 1 A): for example, it is possible to introduce on the maximum value of the signal THLC an offset so that the maximum value allowed for the supply source 12, including the ripple, will not be exceeded.

As compared to the approaches in which the maximum current circulating in the load (motor M) is controlled, by limiting it, without controlling the current of the supply source 12, one or more embodiments as exemplified in FIG. 3 enable a gain in terms of acceleration to be achieved.

It will likewise be appreciated that the additional components envisaged for implementing one or more embodiments as exemplified in FIG. 3 (comparator 26, UP/DOWN counter 28, multiplier 30, etc.) may all be of a digital type and hence be produced at a lower cost and without requiring calibration.

Figure 4:
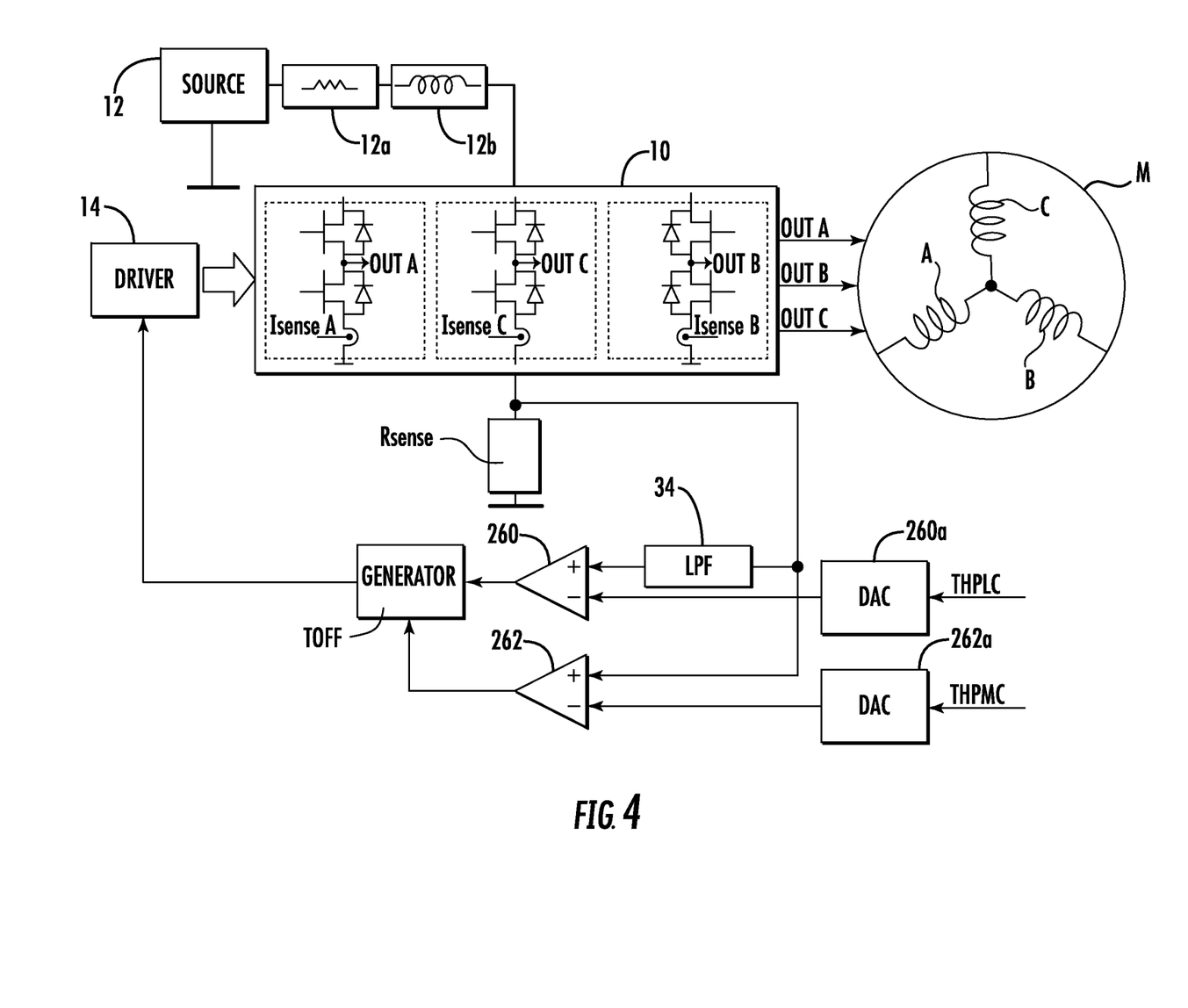
FIG. 4 is a block diagram of an apparatus incorporating a system according to embodiments of this disclosure.

The diagram of FIG. 4 exemplifies one or more embodiments in which an estimate of the peak current delivered by the supply source 12 is made.

It may once again be noted that the current delivered by the supply source, in an application that uses a switching power stage such as the stage 10, is of an impulsive type, as likewise impulsive is the current feedback when a current-sensing element, such as for example the resistance Rsense, is used.

A pulse signal of this type coming from the sensing element (for example, Rsense) can be subjected to a lowpass filtering (for example, in 34—FIG. 4) so as to obtain a signal having a certain oscillation around its mean value, hence a filtered signal having a mean value, a minimum value, and a maximum value (the latter two values corresponding to what is commonly referred to as "ripple").

If filtering of the signal coming from the sensing element (for example, Rsense) is of the same nature (for example, it has the same cutoff frequency) as the RLC lowpass filter generated by the connection cables of the supply source 12, i.e., by the resistance 12a, by the inductance 12b, and by the filter capacitance or capacitances C, then the filtered signal coming from the sensing element (for example, Rsense) may constitute an amperometric representation, i.e., a sufficiently faithful copy, of the current delivered by the supply source 12 in terms of mean value and amplitude of the ripple.

In one or more embodiments, by using as feedback signal the signal coming from the sensing element (for example, Rsense) subjected to lowpass filtering in 34, it is possible to carry out a control of the peak value of the current delivered by the supply source 12.

In other words, through filtering (for example, in 34) of the feedback signal, it is possible to generate a faithful copy of the current delivered by the supply source 12 and control the peak value of the current itself using the copy as feedback signal in the circuit dedicated to current limitation.

The diagram of FIG. 4 exemplifies a current control in which the pulsed signal coming from the sensing element (Rsense) is subjected to lowpass filtering by means of the filter 34 for being used as feedback signal in a current-limiting circuit that may comprise a first comparator 260 and a second comparator 262 that receive on their inputs: in the case of the comparator 260: on the first input, for instance, the non-inverting input, the feedback signal (coming, for example, from Rsense) which undergoes lowpass filtering in 34 and, on the second input, for instance, the inverting input, a peak threshold value of the line current (i.e., of the current that can be delivered by the source 12) THPLC, converted into analog in a D/A converter 260a; and in the case of the comparator 262: on the first input, for instance, the non-inverting input, the feedback signal (coming, for example, from Rsense), and, on the second input, for instance, the inverting input, a peak threshold value of the load current (i.e., current in the motor M) THPMC, converted into analog in a D/A converter 260b.

The foregoing is obtained with the module TOFF that supplies to the module 14 the value of the duty-cycle as a function of the outputs of the two comparators 260, 262.

In one or more embodiments the module TOFF may comprise a monostable circuit capable of generating pulses of constant duration (constant TOFF). When the current threshold is reached, the module TOFF is triggered (by the output of the comparator 260 or by the output of the comparator 262), thus generates a pulse of constant duration that imposes a zero voltage on the load of equal duration (constant TOFF). During the time TOFF, the current in the load will undergo a decay, thus guaranteeing current control.

The current-control circuit exemplified in FIG. 4 operates as a peak-current limiter so that the current effectively supplied by the source 12 is limited to the peak value considered admissible for the source 12 itself, likewise controlling the maximum value of current circulating in the load so as to prevent high currents that might damage the power stage and/or the load.

In this way, the feedback signal generated by the comparator 260 can drive the generator TOFF so as to increase or decrease the duty-cycle of the stage 10 in order to increase or decrease, respectively, the current delivered by the latter to the load (motor M), with the effect of keeping the peak value of the line current delivered by the source 12 within the maximum deliverable value, represented by the threshold THPLC (in practice, keeping it at this threshold value). It is thus possible to carry out an action of control of current (peak current) absorbed by the source 12, thus improving exploitation thereof.

At the same time, via the comparator 262, the current in the motor M can be controlled, maintaining its peak value within the threshold THPMC.

One or more embodiments, as exemplified in FIG. 4, are based upon a lowpass filtering (for example, in 34) of a pulsed feedback signal that is a copy of the current delivered by the supply source 12.

The pulsed signal coming from the sensing element (for example, Rsense) represents the current in the load during the ON phases of the power stage 10 and assumes a zero value during the OFF phases of the power stage 10 itself.

As already mentioned, in one or more embodiments, for sensing the current in the load (motor M), it is possible to use other solutions instead of the resistance Rsense referred to previously. For instance, it is possible to resort to sensing elements integrated in the power stage 10, such as, for example, one or more sense-FETs.

As illustrated in FIG. 5, the sensing function may be a function of sensing of the current in the load (motor M) carried out in 36 starting from the signals IsenseA, IsenseB, IsenseC supplied by three sense-FETs coupled to the three low-side switches (for example, MOSFETs) of the power stage 10.

In this case, unlike the circuit with sensing resistance Rsense, the current feedback signal does not go to zero during the OFF phases of the power stage if it is obtained by turning on the three low-side switches.

In this case, it is possible to reconstruct the pulsed feedback signal starting from the three components IsenseA, IsenseB, IsenseC for the three phases A, B, and C of the motor M before the filtering operation carried out by the lowpass filter 34.

The diagram of FIG. 5 (which as regards the rest may be assumed as practically identical to the diagram of FIG. 4) illustrates an example of reconstruction of the pulsed signal supplied to the filter 34 implemented through a switch 38 controlled by the command signal SW coming from the driving module 14 so as to annul the feedback signal during the OFF time of the power stage. Of course, reference to the use of a switch, such as the switch or switches 38, is a purely indicative in so far as it is possible to adopt any other method suitable for reconstructing the pulsed signal.

Is will likewise be appreciated that in the diagram of FIG. 5 it has been assumed that the reconstruction of the pulsed signal regards only the comparator 260, whereas the comparator 262 is able to use the non-manipulated signal. In one or more embodiments, it is possible to reconstruct the pulsed signal upstream of both of the comparators 260 and 262.

Of course, without prejudice to the underlying principles, the details of construction and the embodiments may vary, even significantly, with respect to what has been illustrated herein purely by way of non-limiting example, without thereby departing from the extent of protection.

The extent of protection is defined by the annexed claims.

That which is claimed:

1. A method of driving a load, the method comprising:
    sensing a load current corresponding to a current circulating in the load;
    estimating a value of a source current based upon the load current sensed and a duty-cycle of a switching power stage, the duty-cycle of the switching power stage being a ratio between an ON time and a summation of the ON time and an OFF time of the switching power stage, the source current corresponding to a current delivered by a power supply source to the switching power stage coupled to the load;
    generating a feedback signal which assumes different values based upon comparing the source current estimated with a source current threshold value; and
    driving the switching power stage with the feedback signal by changing the load current as a function of the different values thereby controlling said source current.

2. The method of claim 1, comprising operating the switching power stage with the duty-cycle; and varying the duty-cycle as a function of the feedback signal.

3. The method of claim 1, comprising operating the switching power stage with the duty-cycle; and annulling the feedback signal during an off time of the duty-cycle.

4. The method of claim 1, wherein sensing comprises sensing the load current by a sensing resistance coupled to the switching power stage.

5. The method of claim 1, wherein sensing comprises sensing the load current by a sense-FET included in the switching power stage.

6. The method of claim 1, wherein the power supply source is coupled to the switching power stage via a lowpass filtering line; and wherein estimating further comprises estimating the source current by lowpass filtering with a same cutoff frequency of the lowpass filtering line, the load current sensed.

7. The method of claim 1, comprising selecting the source current threshold value as a mean value of current deliverable by the power supply source.

8. The method of claim 1, comprising selecting the source current threshold value as a peak value of current deliverable by the power supply source.

9. The method of claim 1, comprising selecting the source current threshold value as a peak value of current deliverable by the power supply source minus an offset value, the offset value being variable as a function of a duty-cycle of the switching power stage.

10. The method of claim 1, comprising generating the feedback signal as a function of a result of comparing the source current estimated with the source current threshold value and a result of comparing the load current sensed with a respective peak threshold value so that the load current is limited to the respective peak threshold value.

11. A method of driving a load, the method comprising:
    sensing a load current corresponding to a current circulating in the load;
    estimating a value of a source current based upon the load current sensed that is subjected to a low pass filtering, the low pass filtering having a same cutoff frequency of a low pass filtering line that couples a power supply source to a switching power stage, the source current corresponding to a current delivered by the power supply source to the switching power stage coupled to the load;
    generating a feedback signal which has different values based upon the source current estimated and a source current threshold value; and
    driving the switching power stage with the feedback signal.

12. The method of claim 11, comprising operating the switching power stage with a duty-cycle; and wherein estimating further comprises estimating the source current as a function of the load current sensed and the duty-cycle.

13. The method of claim 11, comprising operating the switching power stage with a duty-cycle; and varying the duty-cycle as a function of the feedback signal.

14. The method of claim 11, comprising operating the switching power stage with a duty-cycle; and annulling the feedback signal during an off time of the duty-cycle.

15. The method of claim 11, wherein sensing comprises sensing the load current by a sensing resistance coupled to the switching power stage.

16. The method of claim 11, wherein sensing comprises sensing the load current by a sense-FET included in the switching power stage.

17. The method of claim 11, comprising selecting the source current threshold value as a mean value of current deliverable by the power supply source.

18. The method of claim 11, comprising selecting the source current threshold value as a peak value of current deliverable by the power supply source.

19. The method of claim 11, comprising selecting the source current threshold value as a peak value of current deliverable by the power supply source minus an offset value, the offset value being variable as a function of a duty-cycle of the switching power stage.

20. The method of claim 11, comprising generating the feedback signal as a function of a result of comparing the source current estimated with the source current threshold value and a result of comparing the load current sensed with a respective peak threshold value so that the load current is limited to the respective peak threshold value.

21. An electronic device comprising:
a switching power stage configured to feed a load current to a load from a power supply source delivering a source current to said switching power stage, the load current corresponding to a current circulating in the load, the source current corresponding to a current delivered by the power supply source to the switching power stage;
a sensor configured to sense the load current;
an estimator circuit configured to estimate a value of the source current from the load current sensed by said sensor and a duty-cycle of the switching power stage, the duty-cycle of the switching power stage being a ratio between an ON time and a summation of the ON time and an OFF time of the switching power stage;
a comparator configured to compare the source current estimated by said estimator circuit with a source current threshold value;
a feedback generator responsive to said comparator for generating a feedback signal which assumes different values as a function of a result of comparing by the comparator; and
a driver configured to drive said switching power stage by the feedback signal by changing the load current as a function of the different values.

22. The electronic device of claim 21, wherein said switching power stage is configured to operate with the duty-cycle varying as a function of the feedback signal.

23. The electronic device of claim 21, wherein said switching power stage is configured to operate with the duty-cycle; and wherein said feedback generator is configured to annul the feedback signal during an off time of the duty-cycle.

24. The electronic device of claim 21, wherein said sensor comprises a sensing resistance coupled to said switching power stage.

25. The electronic device of claim 21, wherein said sensor comprises a sense-FET included in said switching power stage.

26. The electronic device of claim 21, the load comprises an electric motor.

27. The electronic device of claim 26, wherein said electric motor comprises an electric motor of a hard disk drive.

28. The electronic device of claim 21, wherein the comparator is configured to select the source current threshold value as a peak value of current deliverable by the power supply source minus an offset value, the offset value being variable as a function of the duty-cycle of the switching power stage.

29. The electronic device of claim 21, wherein the comparator is configured to select the source current threshold value as a peak value of current deliverable by the power supply source.

30. The electronic device of claim 21, wherein the comparator is configured to select the source current threshold value as a mean value of current deliverable by the power supply source.

* * * * *